Sept. 16, 1958  W. J. DERNER ET AL  2,852,711
ELECTRICAL ROTOR APPARATUS
Filed Oct. 13, 1954  4 Sheets-Sheet 1

INVENTOR.
William J. Derner
Roger W. Burtness
BY
Their Attorney

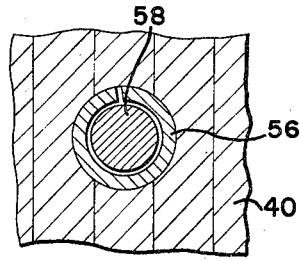
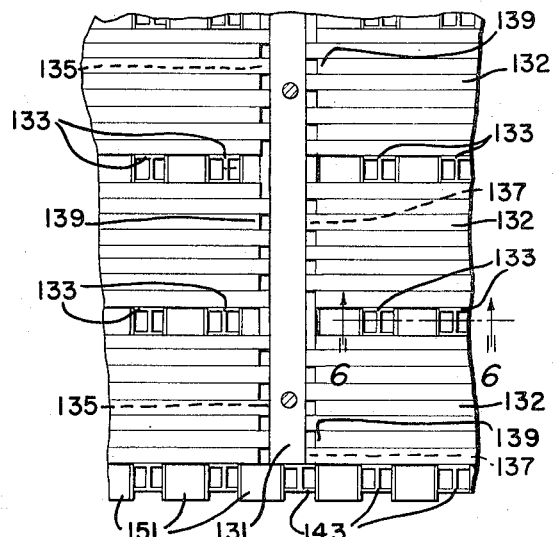
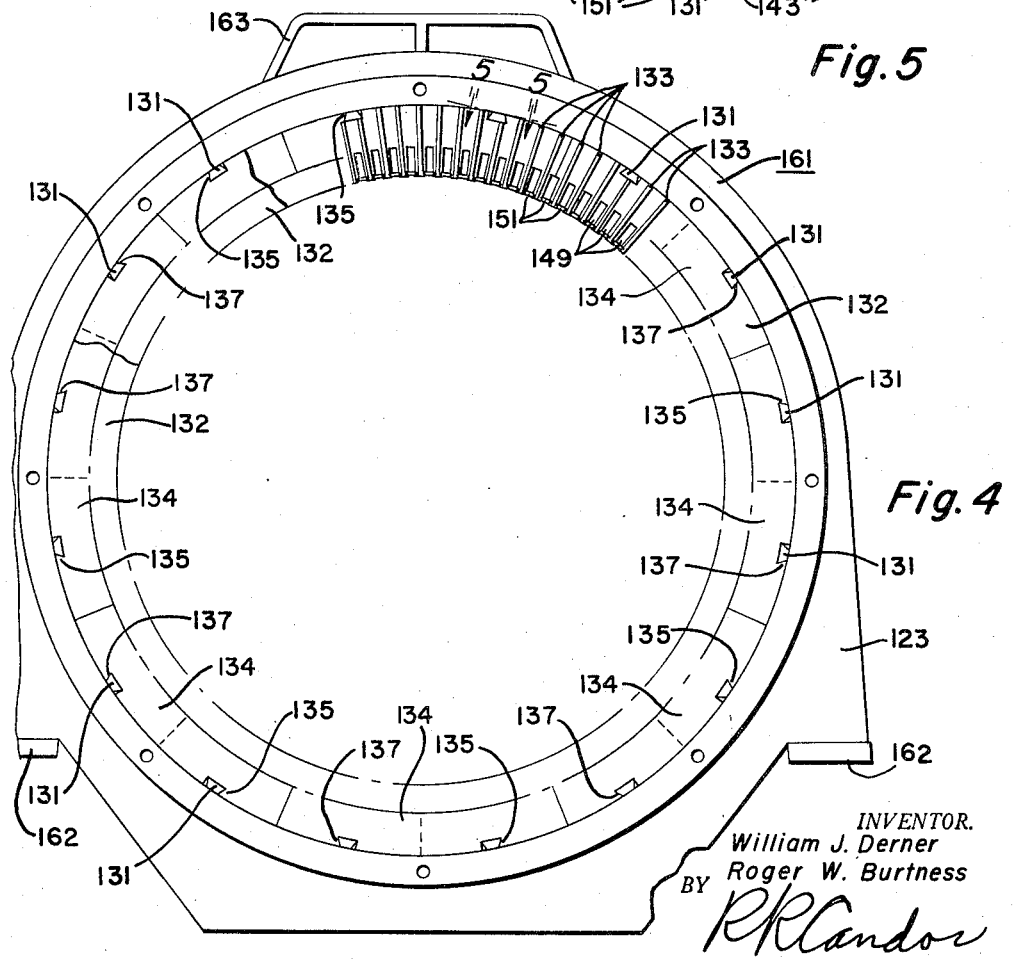
Fig. 3
Fig. 5
Fig. 4
INVENTOR.
William J. Derner
Roger W. Burtness
BY
Their Attorney Sept. 16, 1958  W. J. DERNER ET AL  2,852,711
ELECTRICAL ROTOR APPARATUS
Filed Oct. 13, 1954  4 Sheets-Sheet 4

INVENTOR.
William J. Derner
Roger W. Burtness
BY
Their Attorney

United States Patent Office 2,852,711
Patented Sept. 16, 1958

2,852,711

ELECTRICAL ROTOR APPARATUS

William J. Derner, La Grange, and Roger W. Burtness, La Grange Park, Ill., assignors to General Motors Corporation, Detroit, Mich., a corporation of Delaware Application October 13, 1954, Serial No. 461,988

2 Claims. (Cl. 310—269)

This invention relates to electrical apparatus and more particularly to medium sized medium speed alternators.

It is an object of this invention to provide an alternator design capable of being made in a variety of sizes and having an improved construction with an improved salient pole rotor construction and an improved ventilated stator construction provided with an improved stator mounting.

It is another object of this invention to provide an improved alternator construction having an improved stator mounting and improved collector ring connections as well as a simple means to prevent stray current from passing through the bearings.

Further objects and advantages of the present invention will be apparent from the following description, reference being had to the accompanying drawings, wherein a preferred form of the invention is clearly shown.

In the drawings:

Figure 3 is a fragmentary sectional view taken on the lines 3—3 of Figures 1 and 2;

Figure 4 is an end view of the stator with the ring 141 and the end housing removed to show the stator laminations;

Figure 5 is a fragmentary sectional view taken along the lines 5—5 of Figures 2 and 4;

Figure 1:
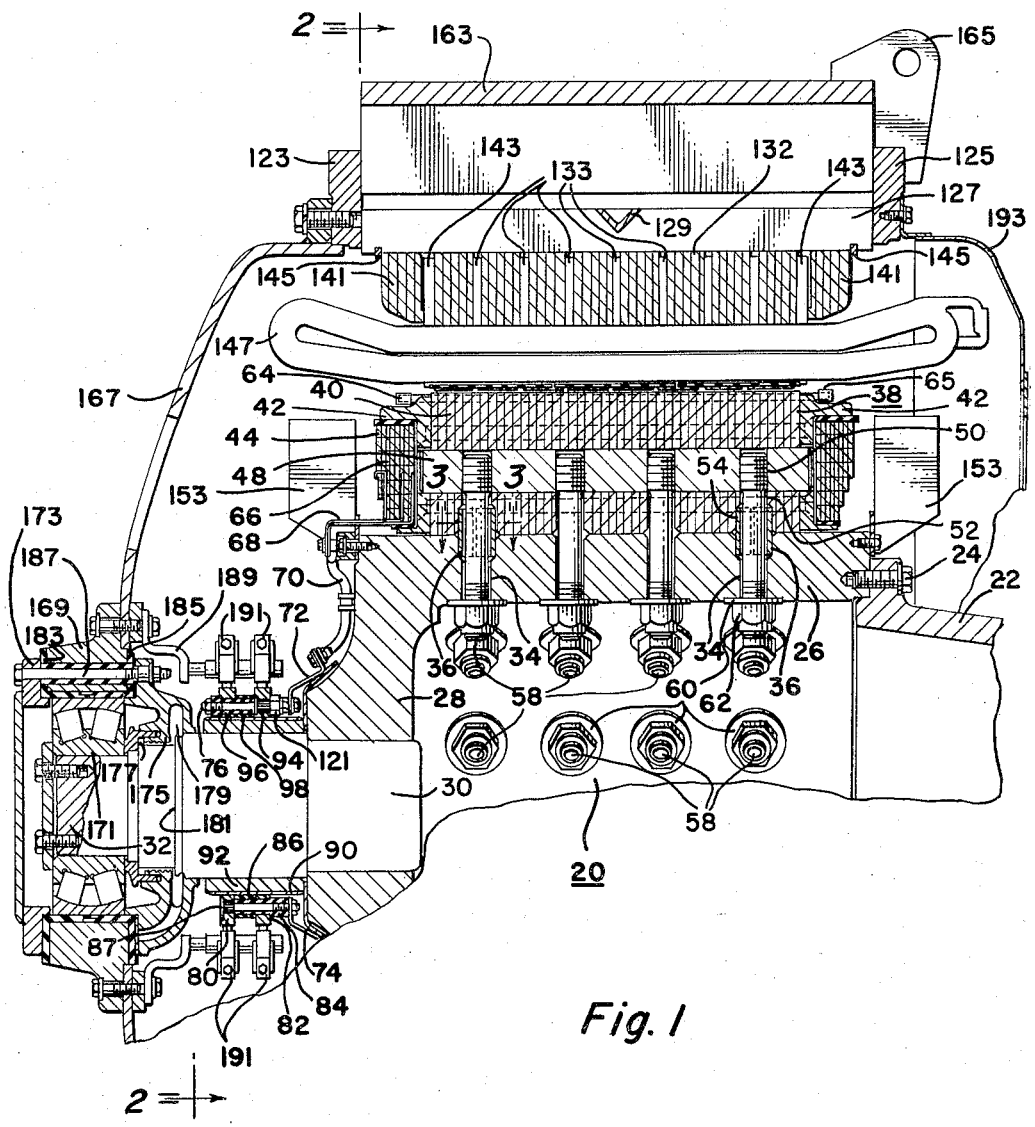
Figure 1 is a vertical sectional view through the upper portion of an alternator disclosing one form of this invention.
Figure 2:
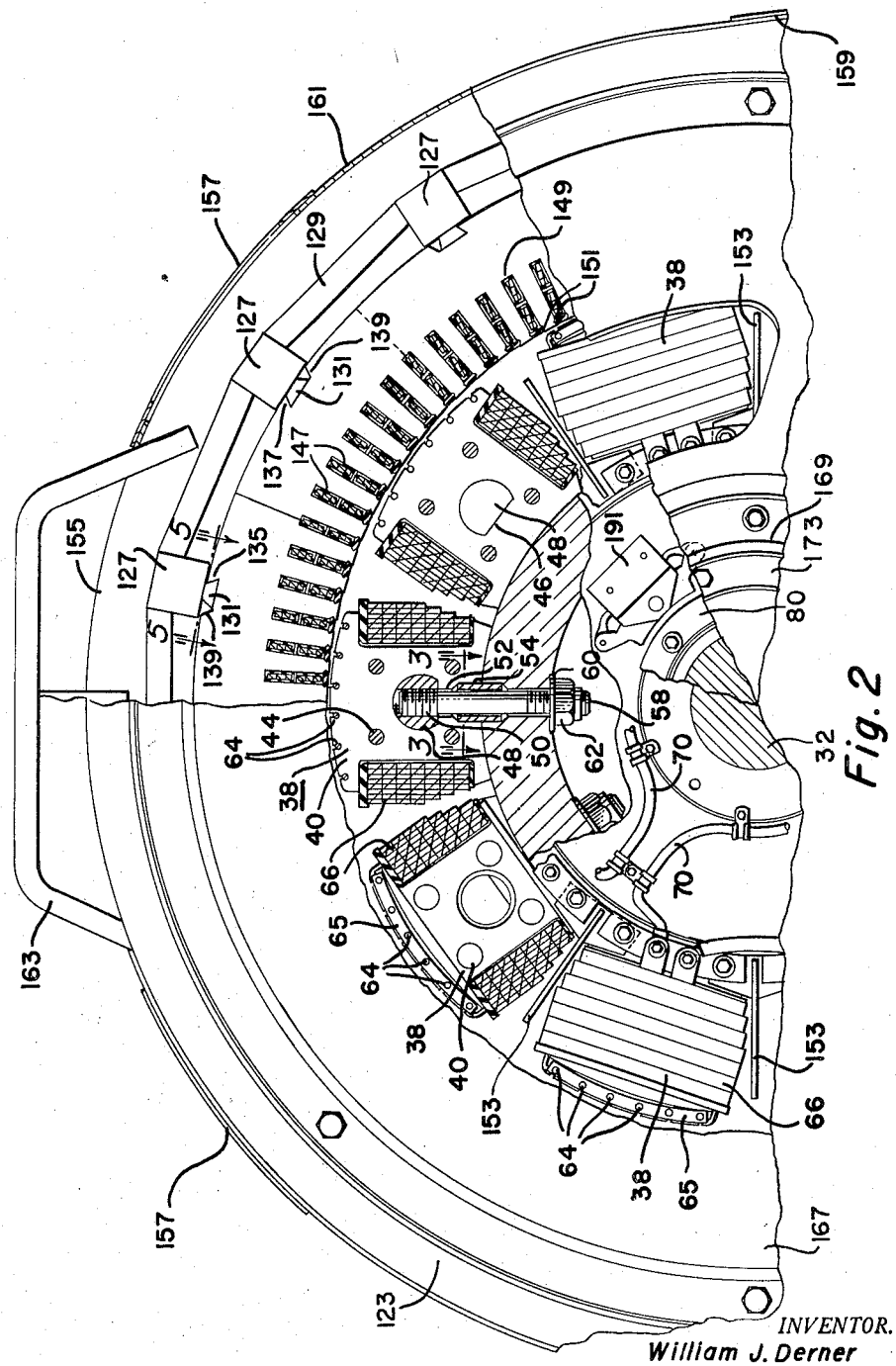
Figure 2 is a fragmentary end view partly in section of the alternator shown in Figure 1.
Figure 6:
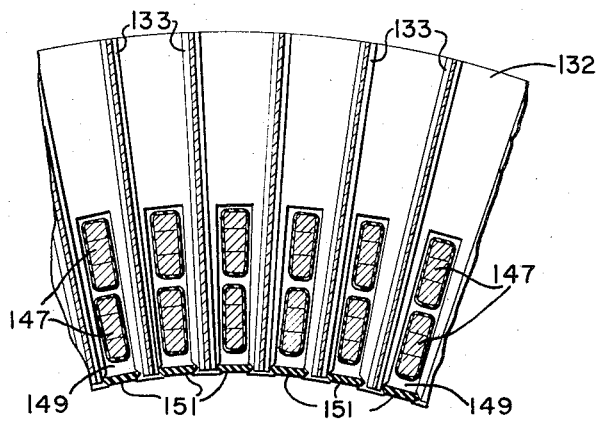
Figure 6 is a fragmentary sectional view taken along the lines 6—6 of Figure 5 showing the air passages in the stator.
Figure 7:
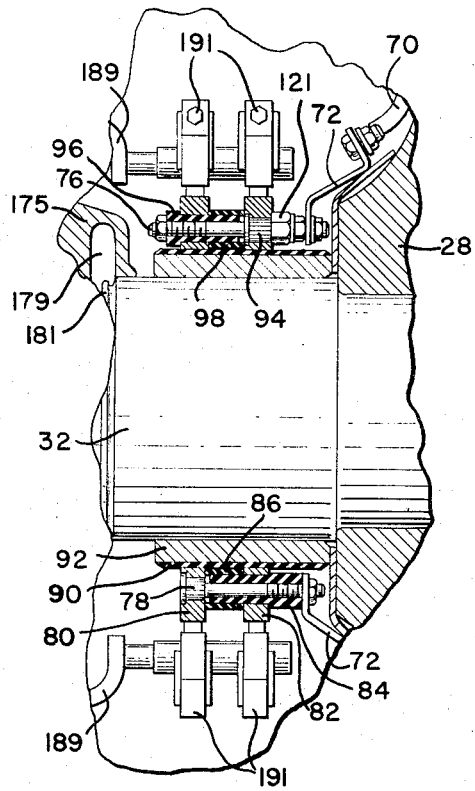
Figure 7 is an enlarged sectional view of one portion of the collector rings and their connections.

Referring now to the drawings and more particularly to Figures 1 and 2 there is shown a rotor 20 adapted to be connected by an end bell 22 to a prime mover such as to the flywheel of a diesel engine. The end bell 22 is provided with a flange through which extends the screws 24 threaded into the adjacent end of a thick cylindrical portion 26. The cylindrical portion 26 forms a part of the main structural member of the rotor. The opposite end of the cylindrical portion 26 is provided with an integral closed end 28 having an aperture therein tightly receiving the stud end 30 of a bearing shaft 32.

The cylindrical portion 26 has radially drilled holes 34 located in ten uniformly distributed axially extending rows of four holes each. The inner set of holes are straight and uniform in diameter. The outer set of holes are provided with a countersunk portion 36.

A laminated pole piece 38 fits over each row of holes. Each of these laminated pole pieces 38 include a stack of laminations 40 and end pieces 42 connected together by four long rivets 44. Each pole piece is provided with a D-shaped hole 46 extending transversely through all of the laminations. Each of the end members 42 are provided with a circular aperture which is aligned with the D-shaped apertures 46 in the laminations. A D-shaped rod 48 extends through this aperture from one end to the other tightly fitting all of the laminations. The flat side of the rod and the aperture is innermost.

The D-shaped rod 48 is provided with perpendicular threaded apertures 50. Aligned with these threaded apertures 50 in the rod 48 are four drilled holes 52 in the pole piece 38 which extend radially inwardly. The outer holes of each row are provided with a countersunk portion 54 which is exactly equal in diameter and aligned exactly with the countersunk portions 38 in the cylindrical portion 26. A split sleeve 56 is lodged in each countersunk portion. It extends from the countersunk portion in the cylindrical portion 26 into the countersunk portion in the pole pieces 38 so that the pole pieces 38 are exactly aligned with the rotor. The pole pieces are fastened to the rotor by studs 58 having enlarged outer threaded ends which are threaded into the transverse apertures in the D-shaped bars 48. The flat faces of each bar 48 facilitate the drilling and threading of the transverse apertures in the bar and also the threading of the studs 58 into the bar. The studs 58 extend inwardly from the bars 48 through the holes 34 and are provided with washers 60 and nuts 62 at their inner ends to firmly fasten the pole pieces 38 in place.

The pole pieces 38 each have six copper bars 64 extending transversely through their laminations adjacent the outer face of the piece which are connected at their ends by transverse bars 65 to form an amortisseur or damper winding. The pole pieces 38 are surrounded by field coils 66 which are connected through metal straps 68 to conductors 70 fastened to the end portion 28.

These conductors 70 are connected by the metal straps 72 and 74 to the stud 76 and the bolt 78. The bolt 78 has an enlarged splined head portion firmly fastened in the collector ring 80. The shank portion of the bolt 78 extends through the second collector ring 82 but is insulated therefrom by the tube 84 of electrical insulating material. The collector rings 80 and 82 are held in spaced relation by a tube 86 of electrical insulating material surrounding the insulating tube 84 and extending between the collector rings 80 and 82. The nut on the inner end of the bolt 78 holds the strap 74 and also holds the collector rings 80 and 82 together. The collector rings are mounted upon a sleeve 90 of insulating material which is mounted upon a collar 92 upon the bearing shaft 32. The stud 76 has an enlarged splined portion 94 firmly fitting in the collector ring 82. On one side of this splined portion 94 is a shoulder. A tube 96 of insulating material surrounds the stud within the collector ring 80. A spacer 98 of electrical insulating material surrounds the insulator 96 and spaces the collector rings 80 and 82. A spacer 121 of electrical insulating material is provided at the opposite end. Nuts at opposite ends of the stud 76 hold the stud rings and spacers in proper relation. The strap 72 is connected by a nut to the inner end of the stud 76.

Figure 8:
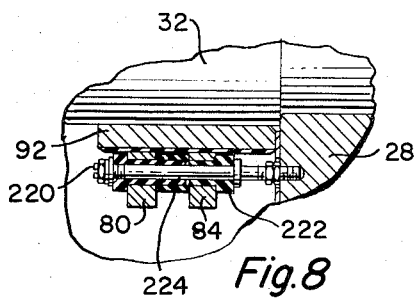
Figure 8 is a fragmentary sectional view of another portion of the collector rings.

The collector rings 80 and 84 are firmly held in place by additional studs 220 (see Figure 8) threading into the end portion 28. An insulating sleeve 222 surrounds each stud 220 and is provided with an enlarged spacer portion between the collector ring and the adjacent collar on each stud 220. An insulating spacer 224 surrounds each sleeve 222 between the rings 80 and 84. Another insulating spacer surrounds each stud 220 between the ring 80 and the fastening nuts on the outer end of each stud 220.

The armature stator is provided with a frame formed of two end plate members 123 and 125 connected by sixteen square cross bars 127. The center portions of these cross bars are connected by angle iron members 129 positioned with their ends of their legs outermost as shown in Figure 1. Preferably the parts are welded together. Fastened to the square bars 127 are the dovetail bars 131 which are in the shape of a regular trapezoid in cross section. These bars 131 orient the stator laminations 132.

The stator laminations are arranged in groups with each of the groups being separated axially by radially extending I-shaped spacers 133. These spacers may be welded or bonded to the adjacent laminations or otherwise secured. The laminations 132 are divided into eight circumferential segments 134. Each segment is provided with projections 135 and 137 which fit against the adjacent sides of the adjacent dovetail cross bars 131 and the adjacent inner faces of the adjacent cross bars 127 forming shoulders alongside the projections as shown in Figures 2 and 4. Each segment of the laminations 132 is provided with the recesses 139 on the opposite side of each of the projections 135 and 137 so that they are spaced from the other sides of the dovetail bars 131. In this arrangement it will be seen that each segment of the laminations 132 has the projections 135 and 137 located in each alternate space between the dovetail bars 131. However, alternate layers of stator laminations 132 are positioned alternately so that one layer will have its projections 135 and 137 located between one set of alternate spaces between the dovetail bars 131 and the next succeeding layer of laminations will have its projections 135 and 137 extending between the other alternate set of spaces between the dovetail bars 131. In this way the stress upon the dovetail bars 131 is substantially opposite and equal so that the resultant stress is substantially cancelled.

The stator laminations 132 are prevented from axial movement by the latching rings 141 which are spaced from the laminations 132 by radially I-shaped spacers 143. The latching rings 141 are held tightly in place by keys 145 which are welded in place in notches provided in the end portion of each of the square cross bars 127. The stator is provided with a lap winding having a plurality of loops or coils 147 formed of insulated copper bars. The coil sides of two different loops or coils are placed in each of the slots 149 in the laminations 132. The end portions of these slots are notched to receive insulating wedges 151 which hold the coil sides in the slots.

The opposite ends of the cylindrical portion 26 of the rotor 20 are provided with paddle-shaped fan blades 153 fastened by a screw extending through their inner flanges. These fan blades are located between the pole pieces and are set at a slight angle so that they force air inwardly between the pole pieces from which point the air flows radially outwardly in the spaces alongside the I-shaped spacers 133 and 143 into the space surrounding the stator laminations 132. The air flows between the cross bars 127 out through openings 155, 157 and 159 in the outer casing 161. This circulation of air cools the windings of the poles and also the windings of the stator to prevent the damaging of the insulation by high temperatures. The top of the frame may be provided with an exciter mounting 163 and a lifting eyelet 165. The outer casing is provided with side mounting brackets 162 extending across the end plates 164 which are welded to the ends of the cross bars 127.

The alternator is provided with an end housing 167 having its periphery fastened to the adjacent end plate 123. At its central portion is a bearing support 169. Within the bearing support 169 is a barrel type of self-aligning roller bearing 171. This roller bearing is held in place by the outer bearing cap 173 and an inner bearing member 175 provided with grease retaining pockets 177 and 179. The shaft 32 is provided with an oil flinging surface 181 which prevents the escape of the lubricant into the interior of the alternator. The bearing support 169 is separated electrically from the roller bearing 171 and the members 173 and 175 by complementary spacers 183 and 185 of electrical insulating material. These spacers 183 and 185 and the members 173 and 175 are fastened to the bearing support 169 by the bolts 187 which are surrounded by spacing sleeves of electrical insulating material. The spacers 183 and 185 as well as the insulating sleeve surrounding the bolts 187 prevent any stray current flow through the bearings.

Also fastened to the end housing by the brackets 189 are the brushes 191 which ride upon the collector rings 80 and 82 and are connected electrically to the exciter which is adapted to be mounted upon the mounting 163.

The opposite end of the exciter is enclosed by a slotted winding shield 193 connected to and supported by the ring 125.

While the form of embodiment of the invention as herein disclosed constitutes a preferred form, it is to be understood that other forms might be adopted, as may come within the scope of the claims which follow.

What is claimed is as follows:

1. An electric machine including a rotor having a thick hollow tubular portion and bearing means connected to the tubular portion, said tubular portion having apertures therein, poles including pole pieces mounted over said apertures, said pole pieces having apertures aligned with said apertures in said tubular portion, sleeves extending and fitting in the aligned apertures in the tubular portion and the pole pieces for aligning the pole pieces upon the tubular portion, and threaded fastening means extending through said apertures and sleeves for fastening the pole pieces to the tubular portion.

2. An electric machine including a rotor having a thick hollow tubular portion and bearing means connected to the tubular portion, said tubular portion having apertures therein, poles including pole pieces mounted over said apertures, said pole pieces having apertures aligned with said apertures in said tubular portion, sleeves extending and fitting in the aligned apertures in the tubular portion and the pole pieces for aligning the pole pieces upon the tubular portion, and threaded fastening means extending through said apertures and sleeves for fastening the pole pieces to the tubular portion, said sleeves being split to make them resilient to assist in making a tight fit within said apertures.

References Cited in the file of this patent

UNITED STATES PATENTS

| 630,409 | Reist | Aug. 8, 1899 |
| 789,454 | Reist | May 9, 1905 |
| 1,502,527 | Reichel | July 22, 1924 |
| 1,608,314 | Hibbard | Nov. 23, 1926 |
| 2,209,334 | Jungk | July 30, 1940 |
| 2,209,335 | Jungk | July 30, 1940 |
| 2,460,063 | Cole | Jan. 25, 1949 |
| 2,524,555 | Willits | Oct. 3, 1950 |
| 2,551,030 | Madden | May 1, 1951 |
| 2,593,857 | Windt | Apr. 22, 1952 |
| 2,632,861 | Morton | Mar. 24, 1953 |
| 2,685,658 | Feiertag | Aug. 3, 1954 |

FOREIGN PATENTS

| 17,268 | Great Britain | of 1913 |
| 338,903 | France | Sept. 21, 1904 |
| 629,490 | Germany | May 2, 1936 |
| 629,063 | Great Britain | Sept. 9, 1949 |